US011273400B2

(12) United States Patent
Weiglein et al.

(10) Patent No.: US 11,273,400 B2
(45) Date of Patent: Mar. 15, 2022

(54) STRUCTURAL UNIT INCLUDING A CYLINDRICAL COMPONENT AND A METAL-PLATE ELEMENT, AND MANUFACTURING METHOD

(71) Applicant: Aktiebolaget SKF, Gothenburg (SE)

(72) Inventors: Juergen Weiglein, Oerlenbach (DE); Jürgen Barthelme, Grettstadt (DE); Berthold Beyfuss, Wasserlosen-Kaisten (DE); Hans-Juergen Friedrich, Königsberg-Römershofen (DE); Alfred Radina, Poppenlauer (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 659 days.

(21) Appl. No.: 16/174,777

(22) Filed: Oct. 30, 2018

(65) Prior Publication Data
US 2019/0176071 A1     Jun. 13, 2019

(30) Foreign Application Priority Data

Dec. 12, 2017   (DE) .......................... 102017222532.7

(51) Int. Cl.
*B01D 45/08*     (2006.01)
(52) U.S. Cl.
CPC .................................. *B01D 45/08* (2013.01)
(58) Field of Classification Search
None
See application file for complete search history.

(56) References Cited

U.S. PATENT DOCUMENTS

| | | | | |
|---|---|---|---|---|
| 3,083,832 A | * | 4/1963 | Hathaway | B01D 27/106 210/130 |
| 3,332,554 A | * | 7/1967 | Humbert, Jr. | B01D 27/106 210/130 |
| 4,767,530 A | * | 8/1988 | Gilliam | B01D 35/30 210/232 |
| 6,006,924 A | * | 12/1999 | Sandford | B01D 29/96 210/440 |

(Continued)

FOREIGN PATENT DOCUMENTS

| | | |
|---|---|---|
| CN | 105179394 A | 12/2015 |
| CN | 105465309 A | 4/2016 |

(Continued)

OTHER PUBLICATIONS

Translation of DE102008001134A1 accessed Nov. 2, 2021 (Year: 2009).*

(Continued)

*Primary Examiner* — Christopher P Jones
*Assistant Examiner* — Phillip Y Shao
(74) *Attorney, Agent, or Firm* — J-Tek Law PLLC; Scott T. Wakeman; Mark A. Ussai (57) ABSTRACT

A structural unit includes a cylindrical component and a metal-plate element having a through-neck, and the cylindrical component extends though the through-neck and is attached to the cylindrical component. The through-neck substantially determines a position of the metal-plate element relative to the cylindrical component with respect to a radial direction of the cylindrical component. Also an oil mist separator including the structural unit.

8 Claims, 6 Drawing Sheets

(56) References Cited

U.S. PATENT DOCUMENTS

| | | | |
|---|---|---|---|
| 7,784,836 B2* | 8/2010 | Dworatzek | B01D 46/42 285/272 |
| 7,972,403 B2* | 7/2011 | Mouatt | F02M 35/024 55/505 |
| 2008/0155949 A1 | 7/2008 | Dunsch et al. | |
| 2009/0196678 A1 | 8/2009 | Babej et al. | |
| 2009/0199826 A1 | 8/2009 | Meinig et al. | |
| 2010/0180854 A1 | 7/2010 | Baumann et al. | |
| 2013/0223950 A1 | 8/2013 | Babej et al. | |
| 2016/0091074 A1 | 3/2016 | Berruet et al. | |
| 2016/0348790 A1 | 12/2016 | Zuerker et al. | |
| 2018/0193780 A1* | 7/2018 | Harrelson | B01D 27/06 |
| 2021/0164569 A1 | 6/2021 | Zuerker et al. | |

FOREIGN PATENT DOCUMENTS

| | | | |
|---|---|---|---|
| CN | 106195267 A | 12/2016 | |
| CN | 106481383 A | 3/2017 | |
| DE | 19627035 A1 | 1/1998 | |
| DE | 202006013527 U1 | 12/2006 | |
| DE | 102007054922 A1 | 1/2009 | |
| DE | 102008001134 A1 * | 10/2009 | ............. F16L 47/00 |
| DE | 202016105158 U1 | 10/2016 | |
| DE | 202018101822 U1 | 7/2019 | |
| EP | 1460242 A2 | 9/2004 | |
| EP | 2087213 B2 | 1/2014 | |
| WO | 2007028351 A9 | 8/2007 | |
| WO | 2007137868 A2 | 12/2007 | |

OTHER PUBLICATIONS

Search report from the German Patent Office dated Apr. 28, 2020 in related application No. 20 2017 107 564.8, and partial translation thereof.

Office Action and Search Report from the Chinese Patent Office dated Jul. 21, 2021 in related Chinese application No. 201811194881, and translation thereof.

* cited by examiner

Fig. 8 ized in FIG. 1. The structural unit
STRUCTURAL UNIT INCLUDING A CYLINDRICAL COMPONENT AND A METAL-PLATE ELEMENT, AND MANUFACTURING METHOD

CROSS-REFERENCE

This application claims priority to German patent application no. 10 2017 222 532.7 filed on Dec. 12, 2017, the contents of which are fully incorporated herein by reference.

TECHNOLOGICAL FIELD

The disclosure is direct to a structural unit comprising a cylindrical component and a metal-plate element attached thereto.

BACKGROUND

An oil mist separator is known which includes a structural unit formed from a cylindrical component and a metal plate attached thereto.

SUMMARY

An aspect of the present disclosure is to provide a structural unit of the above-described type having high efficiency.

According to the present disclosure, the metal-plate element includes a through-neck that substantially determines a radial position of the metal-plate element relative to the cylindrical component. In particular, a simple manufacturability of the structural unit can be achieved since a positioning of the cylindrical component relative to the metal-plate element is effected using the through-neck, and the positioning thus need not be effected in a complicated manner in a spraying tool, using which plastic is sprayed-on onto the component for attaching the metal-plate element.

According to another aspect of the present disclosure, an oil mist separator includes a structural unit, and the structural unit comprises a metal plate element having a through-neck defined by a plurality of circumferentially spaced segments bent out of a plane of the metal plate element. Each of the segments has a body portion with a circumferential undercut, and a plastic body is overmolded on the through-neck and extends into the undercuts. A cylindrical component extends through the plastic body and through the through-neck such that the segments of the segmented through neck and the plastic body define a radial position of the cylindrical component relative to the metal plate element.

Further advantages will become apparent from the following description of the drawings. An exemplary embodiment of the invention is depicted in the drawings. The drawings, the description, and the claims contain numerous features in combination. The person skilled in the art will also advantageously consider the features individually and in further meaningful combinations.

DETAILED DESCRIPTION

Figure 1:
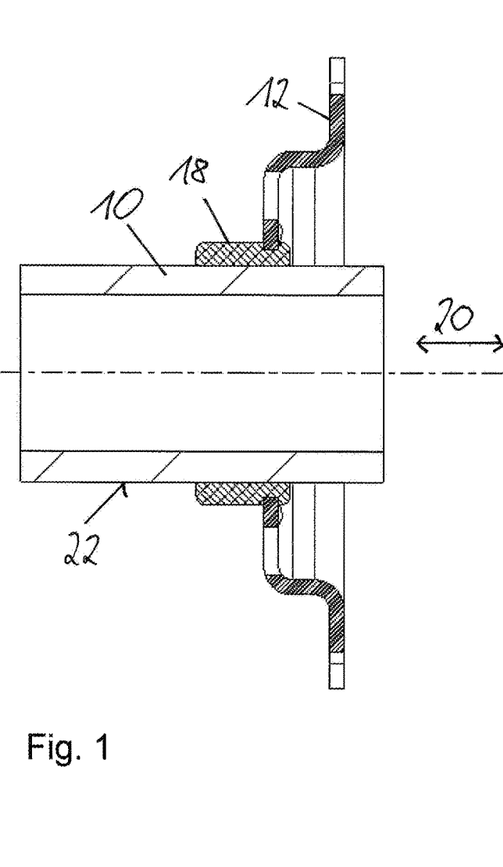
FIG. 1 is a sectional view along an axial direction through a structural unit according to the present disclosure.
Figure 2:
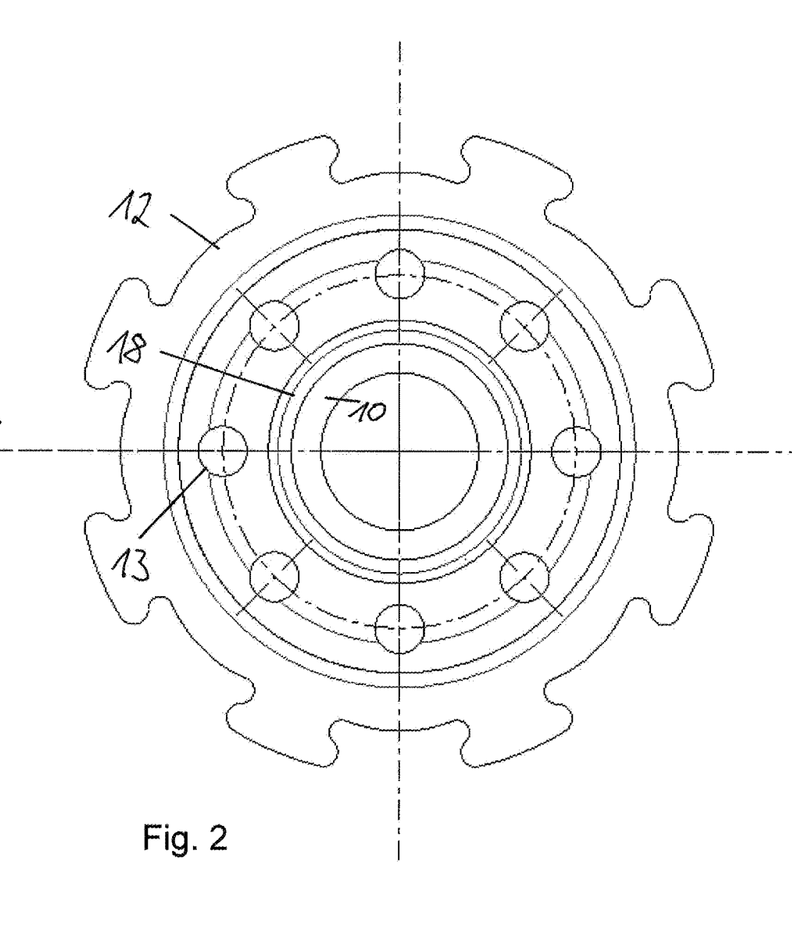
FIG. 2 is a plan view of the structural unit of FIG. 1 along an axial direction.
Figure 3:
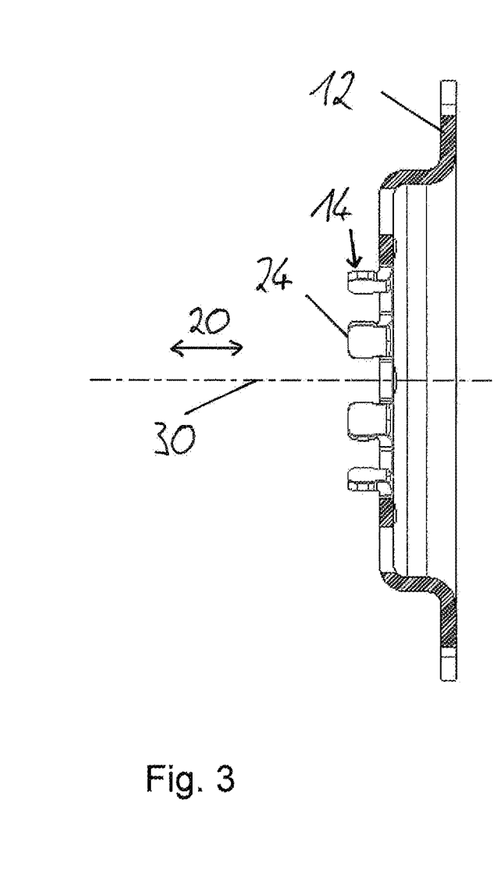
FIG. 3 is a sectional view along the axial direction through a metal-plate element of the structural unit of FIG. 1.
Figure 4:
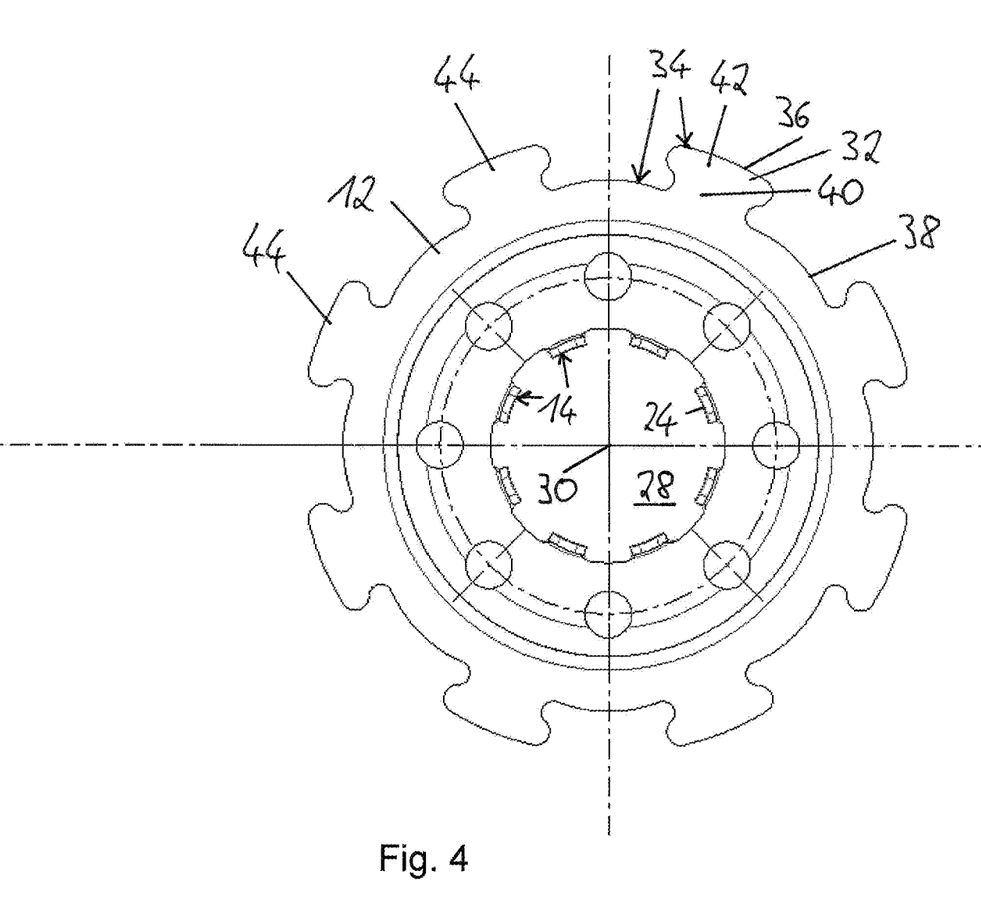
FIG. 4 is a plan view of the metal-plate element along the axial direction.
Figure 5:
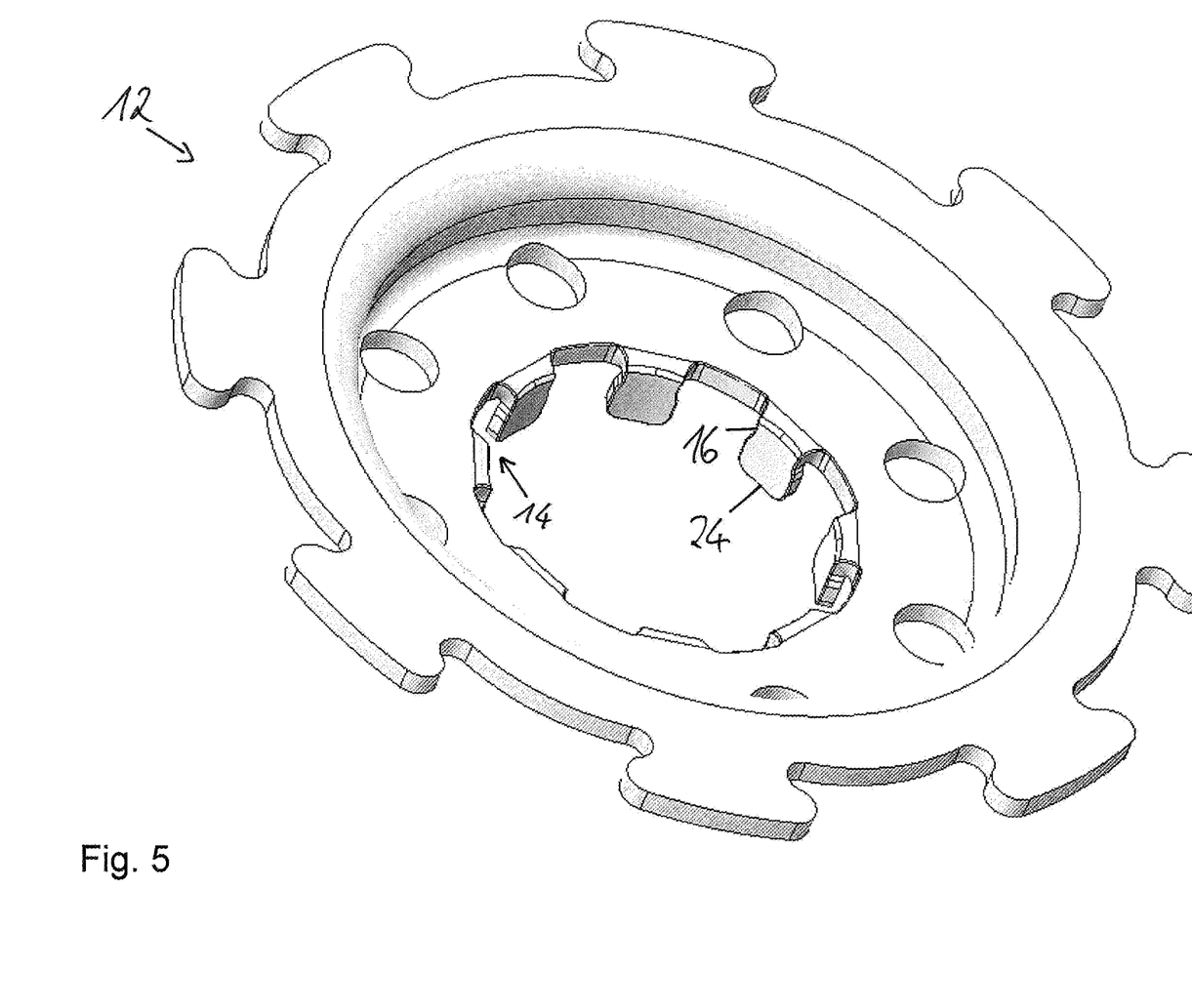
FIG. 5 is a perspective view of the metal-plate element. of FIG. 3.
Figure 6:
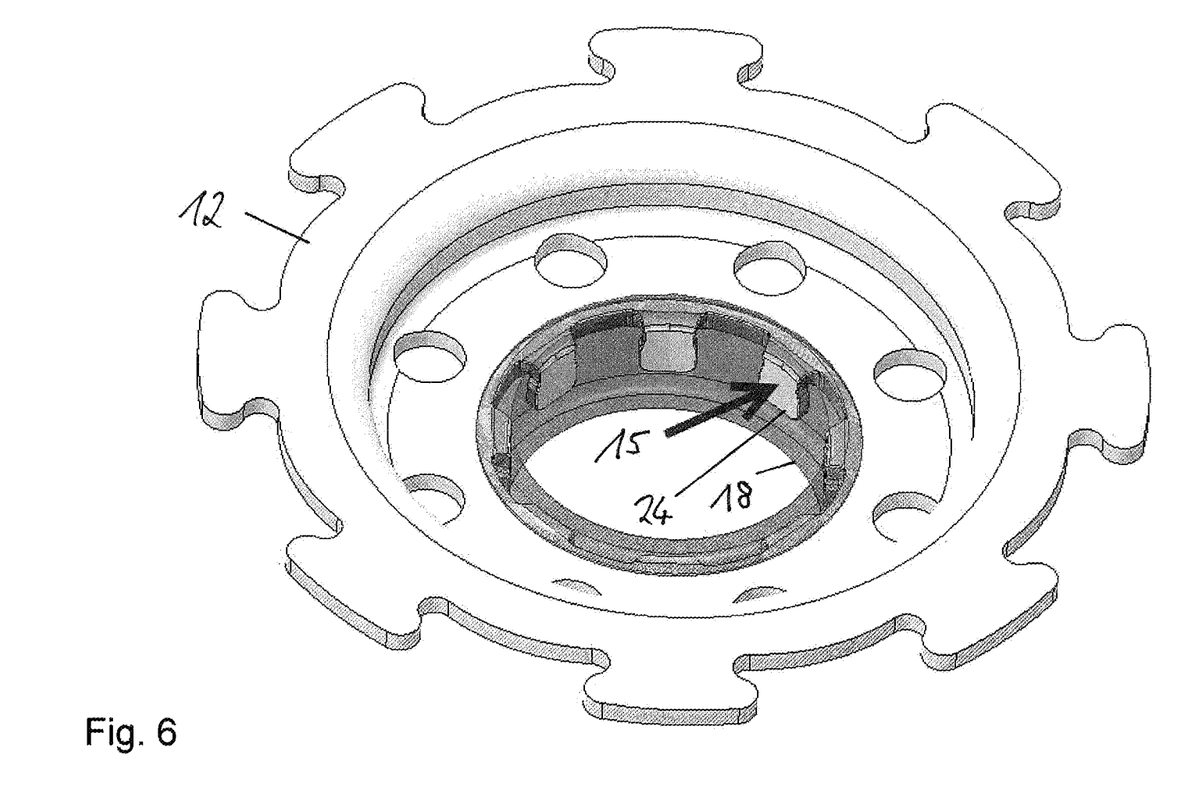
FIG. 6 is a perspective view of the metal-plate element of FIG. 3 with a plastic element of the structural unit attached thereto.
Figure 7:
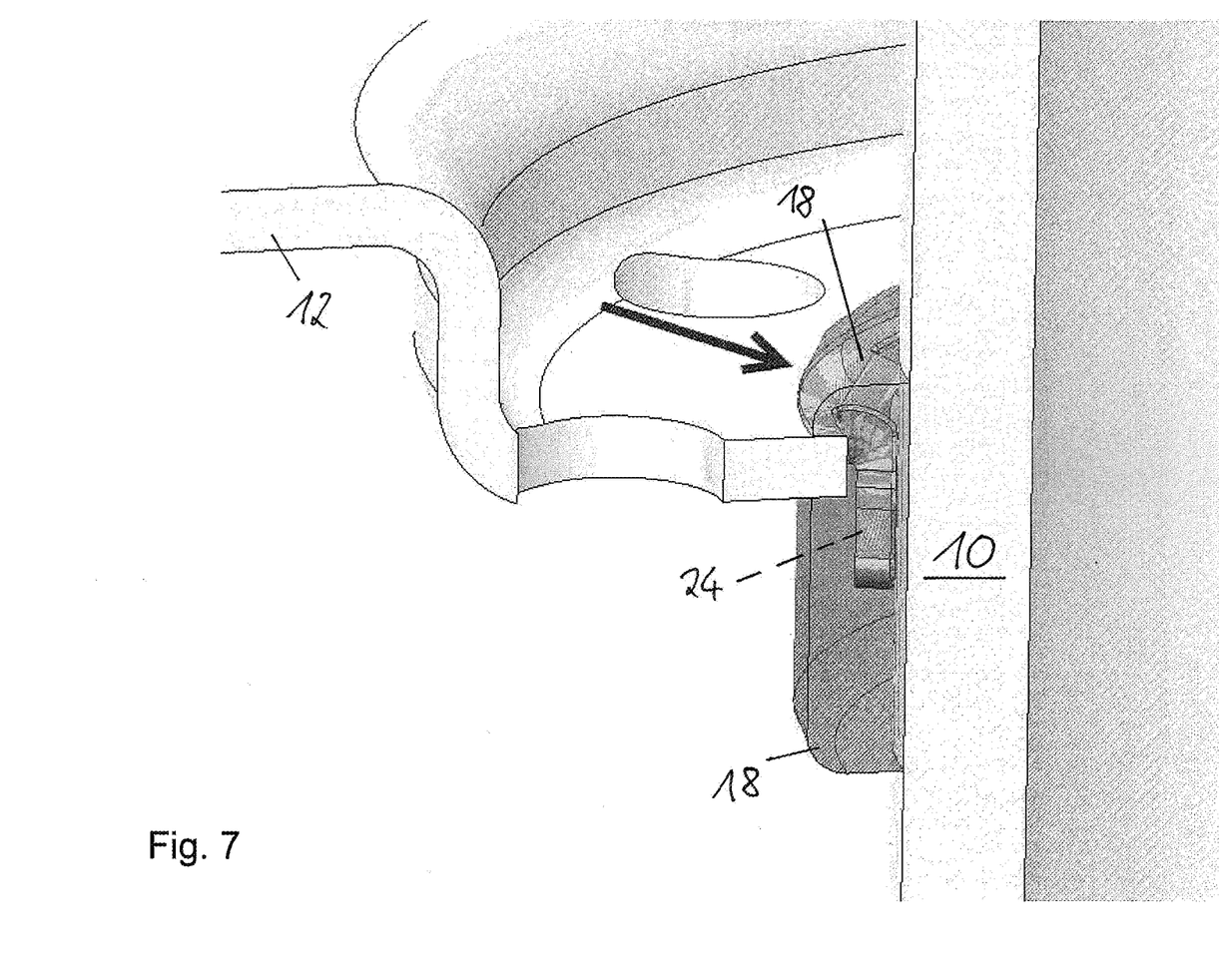
FIG. 7 is a sectional view through the structural unit, wherein a segment of the metal-plate element, which is surrounded by the plastic element, is shown in outline.

FIG. 1 shows an axial section through an inventive structural unit, which includes a cylindrical component 10, and a metal-plate element 12 formed one-piece. The component is configured as a rolling-element bearing, and is depicted only schematically in FIG. 1. The structural unit further includes a plastic element 18 that fixes the metal-plate element to the component. The metal-plate element includes a through-neck 14 that substantially determines, i.e., up to 0.1 mm, a position of the metal-plate element relative to the cylindrical component with respect to radial directions of the component. The through-neck 14 is configured segmented, i.e., it includes individual segments. Radially inner-lying contact surfaces 15 of the segments either abut directly against the component 10 or are at most 0.1 mm removed from the component (FIGS. 3 to 7).

The segments of the through-neck 14 are configured geometrically identical. A segment 24 includes an undercut 16, which is disposed at a point at which the segment 24 merges into the remaining region of the metal-plate element 12. Opposite in the circumferential direction, the segment 24 includes a further undercut. The plastic element 18 fixes the metal-plate element 12 to the cylindrical component 10 with respect to the axial directions 20 of the cylindrical component 10. In a manufacturing of the structural unit of the type this is accomplished by the segments 24 being overmolded with plastic after introducing the cylindrical component 10 into the through-neck 14 of the metal-plate element 12, so that the segments 24 are completely embedded in the plastic. After the curing of the plastic it forms the plastic element 18. Thus axial end sides of the segments 24 also abut against the plastic element 18. Among other things, the metal-plate element 12 is therefore attached to the cylindrical component 10 with respect to the axial directions 20 because the plastic element 18 is also attached to the cylindrical component 10 due to the overmolding. A second reason for the axial attachment of the metal-plate element 12 to the cylindrical component 10 is that with an overmolding of the segments 24 with the plastic the plastic also flows-in into the undercuts of the sections 24 so that after the curing of the plastic the metal-plate element 12 is attached to the cylindrical component 10 with respect to one of the axial directions 20 due to the abutting of the plastic against the undercuts. Due to this axial attaching, a fixing of the metal-plate element 12 to the cylindrical component 10 using a flat surface can be omitted. One advantage to be mentioned of the segmentation is that the injected plastic can flow around the segments 24, and a through-flow of the plastic from one side to the other is made possible or improved, and the plastic can thereby flow-in into the respective undercuts. A further advantage of the undercuts is that a cross-sectional area of the plastic element 18 is increased by them, whereby a higher strength of the base element is given.

The cylindrical component includes a radial outer surface region 22 (FIG. 1), which is free of parts directly abutting against it and free of parts directly attached to it. Using this outer surface region, with an installation of a component that is not part of the structural unit, the component can be positioned relative to the structural unit by orienting and fixing the respective components relative to this outer surface region.

Alternatively or in addition to the outer surface region 22 such outer surface regions of the cylindrical component can be configured such that the plastic element 18 includes segment-shaped recesses that extend up to the surface of the cylindrical component 10 and which are distributed in the circumferential direction of the plastic element. Due to the outer surface region or outer surface regions, a positioning of the structural unit need not be effected via an inner ring of the cylindrical component configured as a rolling-element bearing, which would have the disadvantage that the bearing clearance would distort the positioning. A positioning using the outer surface region or the outer surface regions has the further advantage that this positioning also need not be effected using the metal-plate element, and a position of the metal-plate element relative to the cylindrical component is therefore irrelevant for this positioning. A coarse tolerance of the outer shape of the metal-plate element relative to the outer surface region or the outer surface regions is thus allowed.

Radially outside the segments the metal-plate element includes recesses 13 that can be flowed-through by gases or liquids during an operating process.

The structural unit can be part of an oil mist separator. The plastic can be, for example, a thermoplastic, an elastomer, or a thermoset.

Since in the manufacturing of the structural unit a positioning of the central axis of the cylindrical component relative to the metal-plate element is effected by the radially inner-lying contact surfaces of the segments, a complicated positioning of the metal-plate element relative to the cylindrical component in the injection tool, which is used for overmolding with the plastic, is eliminated. The metal-plate element and the cylindrical component are positioned coaxially in the structural unit, and the metal-plate element supports forces of the cylindrical component that act in the radial direction. The mentioned positioning of the central axis of the cylindrical component relative to the metal-plate element by the radially inner-lying contact surfaces of the segments also includes a certain supporting of the cylindrical component against tilting. If, for example, a shaft is connected to the inner ring of the cylindrical component configured as a bearing, and the shaft is only acted upon approximately in the radial direction by a force, the segments support the bearing against tilting. Without the segments the plastic would probably tear in such a situation, and the bearing would no longer be secured in its position.

In principle it is conceivable that there is no clearance fit between the cylindrical component and the metal-plate element, but rather a transition- or press-fit. Furthermore, it is also alternatively conceivable that the segments extend in various axial directions starting from the regions wherein they merge into a region of the metal-plate element that includes the recesses.

In any case the segments of the metal-plate element also have a support function in the radial direction.

Figure 8:
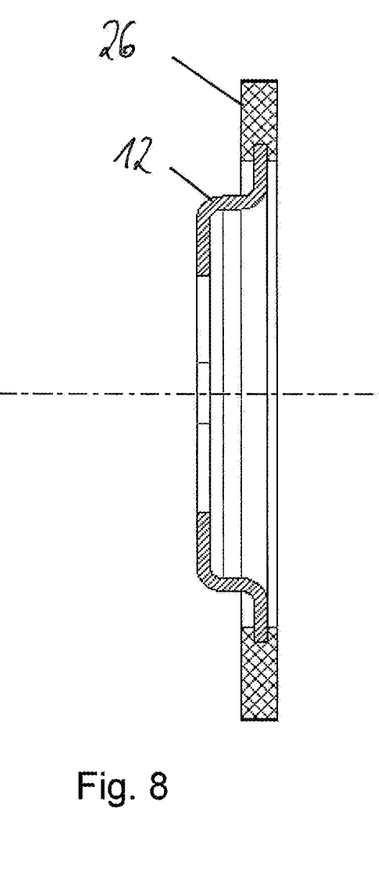
FIG. 8 is a sectional view through a device including a plastic unit and the metal-plate element, wherein an inner region of the metal-plate element is depicted in a simplified manner.
Figure 9:
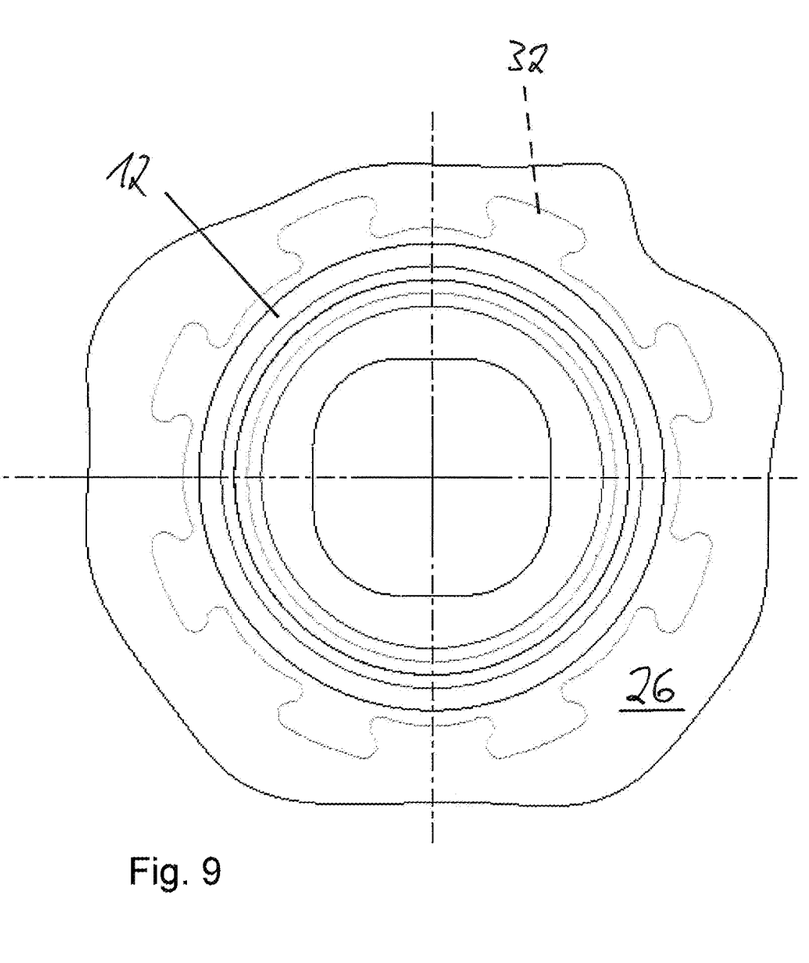
FIG. 9 is a plan view of the structural unit along the axial direction, wherein an inner region of the metal-plate element is also shown in a simplified manner, and segments of the metal-plate element, which are not directly visible, are shown in outline.

The metal-plate element 12 is part of a device that also includes a plastic unit 26 (FIGS. 8 and 9). The metal-plate element is attached to the plastic unit 26. Centrally the metal-plate element includes a through-hole 28 (FIG. 4) which is configured symmetric with respect to an axis 30, i.e., that rotations by 90°, 180° and 270° about the axis transform a boundary of the through-hole in a geometrically identical manner. On a first shaping 32, which is disposed on a radial outer region 34 of the metal-plate element, the metal-plate element includes a first circle-segment shaped contour 36 that is non-centric with respect to the axis 30, i.e., that a center point of the circle whose part is the contour 36 does not lie on the axis 30. Furthermore, the metal-plate element includes a second circle-segment shaped contour 38 on its radial outer region 34 that is also non-centric with respect to the axis 30. The shaping includes a first region 40 that has a shorter distance to the axis 30 than a second region 42 of the shaping. The first region 40 extends less far in the circumferential direction of the axis 30 than the second region 42 extends in the circumferential direction. With respect to a viewing direction along the axis 30 onto the metal-plate element the shaping extends in the radial direction and the circumferential direction.

In addition to the shaping 32, the metal-plate element includes further shapings 44 that are also disposed on the radial outer region 34 and are uniformly distributed over the circumference of the metal-plate element together with the shaping 32. The shapings 44 are geometrically identical to the shaping 32. Between each two adjacent shapings the metal-plate element has a contour that is circle-segment shaped and is non-centric with respect to the axis 30.

The plastic unit is configured one-piece and a housing or part of a housing and is also a part of the oil mist separator.

The plastic unit is manufactured by an overmolding of the metal-plate element. In the fully manufactured device the shapings are completely embedded in the plastic unit, and the complete surfaces of the shapings and the circle-segment-shaped contours between the shapings are completely covered with plastic of the plastic unit.

The plastic unit and the metal-plate element have different thermal expansion coefficients. Due to the geometric design of the radial outer region 34 it is ensured that with different temperatures and also different temperature changes of the metal-plate element and of the plastic element a secure and clearance-free attaching of the metal-plate element to the plastic unit is given at any time.

As an example of the last-mentioned secure attaching, two constellations are to be shown. If, for example, the device is brought into a very cold environment and only the metal-plate element is flowed-around by hot gases or liquids, then the plastic unit cools off and shrinks. The metal-plate element becomes hot and expands. This results in an extended setting behavior of the plastic at the attachment points in constructions according to the prior art, while with the presented inventive design only a minimal setting behavior results, since here a non-centrically attached circle segment is disposed at each contact surface between the metal-plate element and the plastic unit.

In the second constellation the device is brought into a warm environment, and the metal-plate element is flowed-around by cool gases or liquids. The plastic unit becomes hot and expands in comparison to the metal-plate element. The metal-plate element cools off and shrinks or does not expand in a manner not conforming to the plastic unit. With constructions according to the prior art the probability is great that a certain radial clearance arises between the plastic unit and the metal-plate element, while in the inventive proposed design no radial clearance occurs, and a fixing of the metal-plate element to the plastic unit is ensured at any time, wherein an interference-fit attaching is always present.

In the present exemplary embodiment the segments of the through-neck are configured identically (FIG. 1). In other exemplary embodiments the segments can be configured in a geometrically different manner. In particular, viewed in the circumferential direction, each second segment can be configured to be axially longer than the segments disposed directly adjacent to it. The axially longer segments can be, for example, approximately as long in the axial direction as an axial extension length of an outer ring of the component 10 configured as a rolling-element bearing. Due to the longer design of some segments in the axial direction a good protection of the component 10 against tilting can be achieved.

Furthermore, one, a plurality of, or all of the segments can also include an extension at their free axial end, which extension extends radially inward at an angle to the segment, and on an end side of an outer ring of the component 10 configured as a rolling-element bearing additionally fixes and axially holds in position the component 10 configured as a rolling-element bearing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved structural units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Component
12 Metal-plate element
13 Recess
14 Through-neck
15 Contact surface
16 Undercut
18 Plastic element
20 Axial directions
22 Outer surface region
24 Segment
26 Plastic unit
28 Through-hole
30 Axis
32 Shaping
34 Outer region
36 Contour
38 Contour
40 Region
42 Region
44 Shaping

What is claimed is:

1. An oil mist separator including a structural unit, the structural unit comprising: a cylindrical component; and a metal-plate element including a through-neck, the cylindrical component extending though the through-neck and the metal plate element being axially and rotationally fixed to the cylindrical component, wherein the through-neck substantially determines a position of the metal-plate element relative to the cylindrical component with respect to a radial direction of the cylindrical component, wherein the through-neck comprises a plurality of circumferentially spaced segments including a circumferential undercut and including a plastic element connecting the metal-plate element to the cylindrical component, and wherein the plastic element is overmolded on the plurality of circumferentially spaced segments.

2. The oil mist separator according to claim 1, wherein a radial distance between the through-neck and the cylindrical component is at most 0.3 mm.

3. The oil mist separator according to claim 1, wherein the plastic element fixes the metal-plate element to the cylindrical component.

4. The oil mist separator according to claim 1, wherein the cylindrical component includes at least one radial outer surface region which is free of parts directly abutting against it and free of parts directly attached to it.

5. The oil mist separator according to claim 1, wherein the metal-plate element is configured one-piece.

6. An oil mist separator comprising a structural unit, the structural unit comprising:
a metal plate element having a through-neck defined by a plurality of circumferentially spaced segments bent out of a plane of the metal plate element, each of the segments having a body portion with a circumferential undercut;
a plastic body overmolded on the through-neck and extending into the undercuts; and
a cylindrical component extending through the plastic body and through the through-neck such that the segments of the segmented through neck and the plastic body define a radial position of the cylindrical component relative to the metal plate element.

7. A structural unit comprising: a cylindrical component; and a metal-plate element including a through-neck, the cylindrical component extending though the through-neck and the metal plate element being attached to the cylindrical component by a plastic component overmolded on the through-neck, wherein the through-neck substantially determines a position of the metal-plate element relative to the cylindrical component with respect to a radial direction of the cylindrical component, wherein the through-neck comprises a plurality of circumferentially spaced segments, and wherein the plurality of circumferentially spaced segments are bent out of a plane of the metal plate element.

8. The structural unit according to claim 7, wherein at least one of the plurality of circumferentially spaced segments includes an undercut.

* * * * *